(12) United States Patent
Kita et al.

(10) Patent No.: US 10,090,548 B2
(45) Date of Patent: Oct. 2, 2018

(54) FUEL CELL SYSTEM

(71) Applicant: Panasonic Intellectual Property Management Co., Ltd., Osaka (JP)

(72) Inventors: Hiromi Kita, Nara (JP); Kunihiro Ukai, Nara (JP); Toru Sukawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 553 days.

(21) Appl. No.: 14/923,839

(22) Filed: Oct. 27, 2015

(65) Prior Publication Data

US 2016/0149247 A1 May 26, 2016

(30) Foreign Application Priority Data

Nov. 26, 2014 (JP) .................................. 2014-238350

(51) Int. Cl.
*H01M 8/0662* (2016.01)
*H01M 8/04014* (2016.01)
(Continued)

(52) U.S. Cl.
CPC ............. *H01M 8/0675* (2013.01); *C01B 3/38* (2013.01); *H01M 8/04014* (2013.01);
(Continued)

(58) Field of Classification Search
CPC ......... H01M 8/04014; H01M 8/04022; H01M 8/04067; H01M 8/04701; H01M 8/04708;
(Continued)

(56) References Cited

U.S. PATENT DOCUMENTS

2009/0087705 A1* 4/2009 Fuju ..................... C01B 3/384
429/424
2015/0311552 A1* 10/2015 Sukawa .................. C01B 3/38
429/410

FOREIGN PATENT DOCUMENTS

JP 2010-272333 12/2010
JP 2011-216308 10/2011
(Continued)

OTHER PUBLICATIONS

The Extended European Search Report dated Apr. 18, 2016 for the related European Patent Application No. 15192856.1.

*Primary Examiner* — Jonathan G Leong
*Assistant Examiner* — Heng M. Chan
(74) *Attorney, Agent, or Firm* — McDermott Will & Emery LLP

(57) ABSTRACT

A fuel cell system includes a desulfurizer that removes a sulfur compound in a raw material, a fuel cell unit that performs electric-power generation using fuel obtained by reforming a raw material from which the sulfur compound is removed and electric-power generation air supplied, a combustion exhaust gas passage through which combustion exhaust gas generated by combusting fuel not utilized for the electric-power generation in the fuel cell unit is emitted, a combustion exhaust gas container that is connected to the combustion exhaust gas passage and accommodates the desulfurizer inside the combustion exhaust gas container, a purifier that removes carbon monoxide included in the combustion exhaust gas, and an air heat exchanger that performs heat exchange of the combustion exhaust gas and the electric-power generation air supplied to the fuel cell unit.

8 Claims, 13 Drawing Sheets

(51) Int. Cl.
  *H01M 8/0668*    (2016.01)
  *H01M 8/0612*    (2016.01)
  *H01M 8/04007*   (2016.01)
  *C01B 3/38*      (2006.01)
  *H01M 8/04701*   (2016.01)

(52) U.S. Cl.
  CPC ... *H01M 8/04022* (2013.01); *H01M 8/04067* (2013.01); *H01M 8/0618* (2013.01); *H01M 8/0668* (2013.01); *C01B 2203/0233* (2013.01); *C01B 2203/066* (2013.01); *C01B 2203/127* (2013.01); *C01B 2203/1241* (2013.01); *C01B 2203/1247* (2013.01); *H01M 8/04701* (2013.01); *H01M 8/04708* (2013.01); *H01M 8/04716* (2013.01); *H01M 8/04738* (2013.01)

(58) Field of Classification Search
  CPC ......... H01M 8/04716; H01M 8/04738; H01M 8/0618; H01M 8/0668; H01M 8/0675
  See application file for complete search history.

(56) References Cited

FOREIGN PATENT DOCUMENTS

| | | | |
|---|---|---|---|
| JP | 2013-032238 | 2/2013 | |
| JP | 2013-191280 | 9/2013 | |
| WO | 2012/032744 | 3/2012 | |
| WO | WO-2014083794 A1 * | 6/2014 | ............... C01B 3/38 |

* cited by examiner

FUEL CELL SYSTEM

BACKGROUND

1. Technical Field

The present disclosure relates to a fuel cell system including a desulfurizer that removes a sulfur compound in a raw material supplied to a fuel cell unit, a purifier that removes carbon monoxide in combustion exhaust gas emitted from the fuel cell unit, and a heat exchanger that performs heat exchange of air supplied to the fuel cell unit and the combustion exhaust gas.

2. Description of the Related Art

Conventionally, a fuel cell system has high efficiency of electric-power generation even when the fuel cell system is small in size. Thus, the fuel cell system is utilized as an electric-power generator in a distributed electric-power generation system. Typical examples of a raw material supplied to the fuel cell system include natural gas (urban gas), liquefied petroleum gas (LPG), gasoline, and kerosene, which are supplied from already-existing infrastructures.

The raw material described above includes, for example, a sulfur compound that serves as an odorant for detecting a gas leak or a sulfur compound that originates from the raw material. Such sulfur compounds poison a reforming catalyst for reforming the raw material and an electrode catalyst of a fuel cell, and decrease performance of the catalysts. Thus, the fuel cell system is provided with a desulfurizer that removes the sulfur compound in the raw material.

The desulfurization performance of some desulfurization catalysts for the desulfurizer depend on temperatures. Examples of such desulfurization catalysts include a hydrodesulfurization catalyst that is used in a hydrodesulfurization process and an absorbent desulfurization catalyst that exerts high activity at high temperatures. To increase the desulfurization performance of such desulfurization catalysts, each desulfurization catalyst needs to be heated to a temperature suitable for the desulfurization catalyst. Thus, a fuel cell system (a solid oxide fuel cell system), where the desulfurizer is heated with exhaust heat emitted from the fuel cell or the reformer, such as radiant heat or transferred heat, is proposed (see, for example, Japanese Patent No. 5507119 regarding the hydrodesulfurization and Japanese Unexamined Patent Application Publication No. 2013-191280 regarding the absorbent desulfurization).

A fuel cell system (a solid oxide fuel cell system), where fuel not utilized in electric-power generation of a fuel cell is combusted and the combustion heat is used to heat a desulfurizer, is also proposed. In this case, the combustion exhaust gas caused when the fuel is combusted includes carbon monoxide. Thus, a combustion catalyst that brings the carbon monoxide into oxidative decomposition before the combustion exhaust gas is emitted to the outside is provided in the fuel cell system (see, for example, Japanese Patent No. 5584507).

However, conventional techniques described in above-mentioned Japanese Patent No. 5507119, Japanese Unexamined Patent Application Publication No. 2013-191280, and Japanese Patent No. 5584507 are still susceptible to improvement in view of a quest for further increase in the efficiency and reliability of the fuel cell system.

SUMMARY

One non-limiting and exemplary embodiment provides a fuel cell system where the efficiency and reliability are increased to address conventional issues.

In one general aspect, the techniques disclosed here feature a fuel cell system including a desulfurizer that removes a sulfur compound in a raw material, a fuel cell unit that performs electric-power generation using fuel obtained by reforming a raw material from which the sulfur compound is removed and electric-power generation air supplied, a combustion exhaust gas passage through which combustion exhaust gas generated by combusting fuel not utilized for the electric-power generation in the fuel cell unit is emitted, a combustion exhaust gas container that is connected to the combustion exhaust gas passage and accommodates the desulfurizer inside the combustion exhaust gas container, a purifier that removes carbon monoxide included in the combustion exhaust gas, and an air heat exchanger that performs heat exchange of the combustion exhaust gas and the electric-power generation air supplied to the fuel cell unit, the fuel cell unit being arranged in a first heat insulation space covered with a first heat insulator, the combustion exhaust gas container, the purifier, and the air heat exchanger being arranged in a second heat insulation space covered with a second heat insulator.

The present disclosure is advantageous in that the efficiency and reliability of a fuel cell system can be increased.

The above-described aim, the other aims, the features, and the advantages of the present disclosure are clarified below through the detailed description of preferred embodiments with reference to the accompanying drawings.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
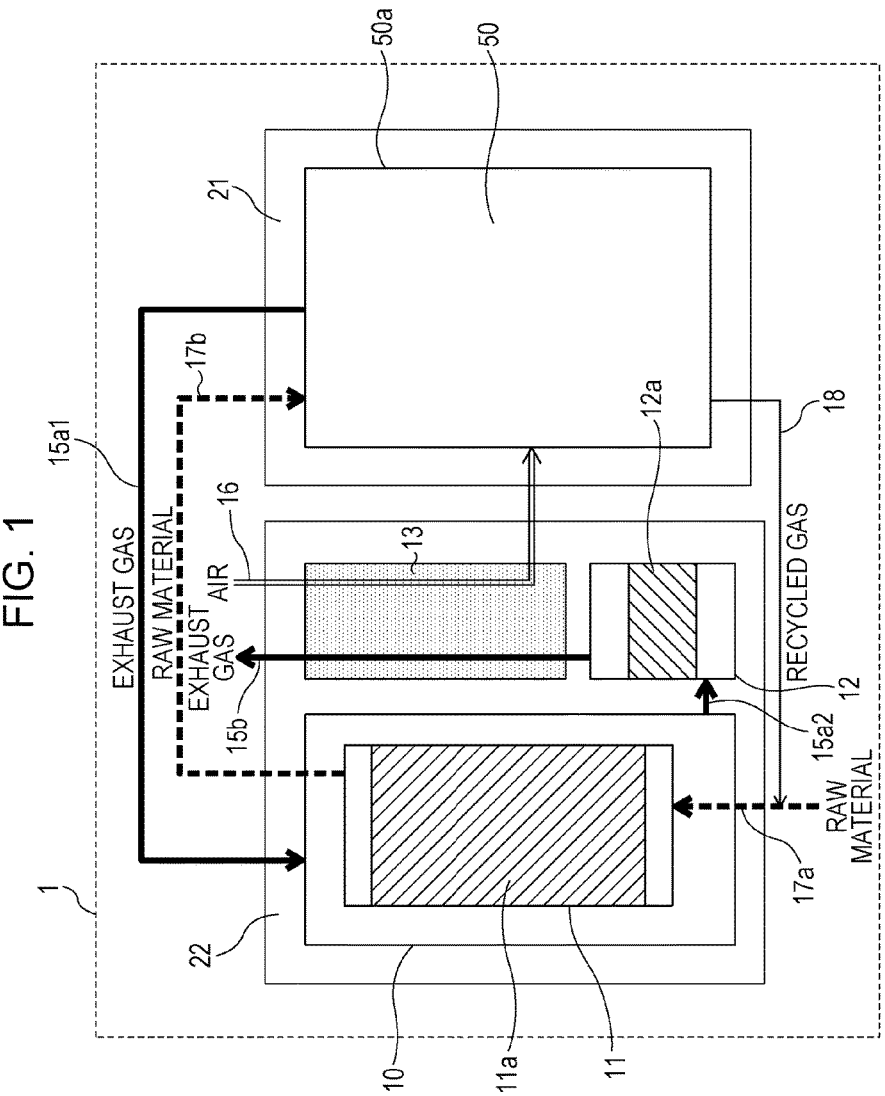
FIG. 1 is a block diagram that schematically illustrates an example of a structure of a fuel cell system according to Embodiment 1 of the present disclosure.

Underlying Knowledge Forming Basis of the Present Disclosure

The present inventors have reviewed increase in the efficiency and reliability of a fuel cell system. The increase in the efficiency of the fuel cell system is achieved by suppressing decrease in the efficiency of electric-power generation and further increasing the efficiency of heat utilization. The reliability of the fuel cell system is increased by removing carbon monoxide included in combustion exhaust gas when the combustion exhaust gas is emitted.

According to conventional techniques of Japanese Patent No. 5507119 or Japanese Unexamined Patent Application Publication No. 2013-191280, the exhaust heat from the fuel cell or the reformer is utilized to heat the desulfurizer. According to conventional techniques of Japanese Patent No. 5584507, the heat caused when the fuel not utilized in the electric-power generation of the fuel cell is combusted, which is referred to as the combustion heat, is utilized to heat the desulfurizer. However, further increase in the efficiency of the heat utilization is desired.

According to the conventional techniques of Japanese Patent No. 5584507, a combustion catalyst for removing carbon monoxide included in the combustion exhaust gas is provided in a heat insulation layer. The combustion heat radiated from a combustor spreads in the overall heat insulation layer. Thus, the combustion catalyst whose performance depends on a temperature may fail to sufficiently exert the performance of removing carbon monoxide because of the temperature much higher than the suitable temperature of the combustion catalyst.

The present inventors have found that effective utilization of thermal energy emitted to the outside of the system together with the combustion exhaust gas enables increase in the efficiency of the heat utilization, suppression of decrease in the efficiency of the electric-power generation, and more reliable removal of the carbon monoxide to be achieved. The present disclosure has been made on the basis of the above-described findings.

A fuel cell system according to a first aspect of the present disclosure includes a desulfurizer that removes a sulfur compound in a raw material, a fuel cell unit that performs electric-power generation using fuel obtained by reforming a raw material from which the sulfur compound is removed and electric-power generation air supplied, a combustion exhaust gas passage through which combustion exhaust gas generated by combusting fuel not utilized for the electric-power generation in the fuel cell unit is emitted, a combustion exhaust gas container that is connected to the combustion exhaust gas passage and accommodates the desulfurizer inside the combustion exhaust gas container, a purifier that removes carbon monoxide included in the combustion exhaust gas, and an air heat exchanger that performs heat exchange of the combustion exhaust gas and the electric-power generation air supplied to the fuel cell unit, the fuel cell unit being arranged in a first heat insulation space covered with a first heat insulator, the combustion exhaust gas container, the purifier, and the air heat exchanger being arranged in a second heat insulation space covered with a second heat insulator.

According to the above-described structure, the fuel cell unit in the first heat insulation space is heated to a high temperature by the combustion heat caused when the fuel is combusted. Consequently, the fuel cell unit is heated to a suitable temperature of a catalyst for a reforming reaction or an electric-power generation reaction, and high efficiency of the electric-power generation can be maintained. The first heat insulation space is thermally insulated from the outside and is also thermally insulated from the second heat insulation space. Thus, the temperature of the first heat insulation space can be kept high and decrease in the efficiency of the electric-power generation can be prevented.

The desulfurizer and the purifier in the combustion exhaust gas container arranged in the second heat insulation space are heated by the combustion exhaust gas. Since the combustion exhaust gas is lower in temperature than the heat of, for example, thermal conduction from the fuel cell unit or the combustion heat, the respective catalysts of the desulfurizer and the purifier in the combustion exhaust gas container are heated to the respective suitable temperatures by the heat of the combustion exhaust gas. Since the air for the electric-power generation, which is herein referred to as the electric-power generation air, is heated by the combustion exhaust gas in the air heat exchanger and is supplied to the fuel cell unit, decrease in the efficiency of the electric-power generation in the fuel cell unit can be suppressed. Since the combustion exhaust gas container, the purifier, and the air heat exchanger are arranged in a single heat insulation space, that is, the second heat insulation space, heat dispersion caused when the combustion exhaust gas moves therebetween can be suppressed. Accordingly, the heat of the combustion exhaust gas is effectively utilized and thermal efficiency is increased. In addition, decrease in the efficiency of the electric-power generation can be suppressed by removing a sulfur compound more surely and preheating the electric-power generation air. Further, the reliability of the fuel cell system can be increased by removing a carbon monoxide more surely.

A fuel cell system according to a second aspect of the present disclosure, which relates to the above-described first aspect, may further include a heater that heats at least one of the combustion exhaust gas container, the desulfurizer, and the purifier. Accordingly, at least one of the combustion exhaust gas container, the desulfurizer, and the purifier is heated by the heater. Thus, the temperature raising time in starting the fuel cell system up can be reduced and the temperature of a catalyst can be made stable.

In a fuel cell system according to a third aspect of the present disclosure, the first heat insulation space may be arranged so as to be adjacent to the second heat insulation space via the first heat insulator and the second heat insulator. Accordingly, heat dispersion from surfaces opposite each other can be suppressed and the efficiency of the heat utilization can be increased.

In a fuel cell system according to a fourth aspect of the present disclosure, which relates to any one of the above-described first to third aspects, the combustion exhaust gas container, the purifier and the air heat exchanger may be arranged via at least one partition wall inside a single container covered with the second heat insulator. Accordingly, while piping for connecting the combustion exhaust gas container, the purifier, and the air heat exchanger can be omitted, costs can be cut and the fuel cell system can be downsized. In addition, the overall surface area (the heat dispersion area) thereof can be greatly decreased and thus, the heat dispersion amount can be reduced and the efficiency of the heat utilization can be increased.

In a fuel cell system according to a fifth aspect of the present disclosure, which relates to the above-described fourth aspect, the partition wall between the air heat exchanger and the combustion exhaust gas container may be provided with a heat-insulating material. Accordingly, the combustion exhaust gas that flows through the combustion exhaust gas container can be prevented from being cooled by the electric-power generation air that flows through the air heat exchanger.

In a fuel cell system according to a sixth aspect of the present disclosure, which relates to at least one of the above-described first to fifth aspects, the combustion exhaust gas may flow through the combustion exhaust gas container, the purifier, and the air heat exchanger in this order. The suitable temperature of the catalyst of the desulfurizer in the combustion exhaust gas container is higher than the suitable temperature of the catalyst of the purifier. Thus, the combustion exhaust gas heats the desulfurizer in which the suitable temperature of the catalyst is high and after that, heats the purifier in which the suitable temperature of the catalyst is lower than the suitable temperature of the catalyst of the desulfurizer. Accordingly, the catalysts can be heated to the respective suitable temperatures.

A fuel cell system according to a seventh aspect of the present disclosure, which relates to any one of the above-described first to sixth aspects, may further include a main air heat exchanger provided in the fuel cell unit. In the fuel cell system according to the seventh aspect, the air heat exchanger may preheat electric-power generation air transferred to the main air heat exchanger. Accordingly, the electric-power generation air is preheated in the air heat exchanger with the combustion exhaust gas and after that, is heated by the main air heat exchanger. Thus, the heat of the combustion exhaust gas can be effectively utilized and the efficiency of the heat utilization of the fuel cell system can be increased. Further, the electric-power generation air can be heated to an operating temperature of the fuel cell or a temperature close to the operating temperature, decrease in the efficiency of the electric-power generation can be suppressed.

A fuel cell system according to an eighth aspect of the present disclosure, which relates to any one of the above-described first to seventh aspects, may further include a lid that covers an opening provided in the purifier so that the opening is openable and closable. Accordingly, the catalyst of the purifier can be replaced by opening the lid of the purifier. Accordingly, the purification performance of the purifier can be semipermanently continued.

Embodiments of the present disclosure are described in detail below with reference to the drawings. Hereinafter, the same references are given to the same or equivalent elements throughout the drawings and overlapping explanations of such elements are omitted.

Embodiment 1

A structure of a fuel cell system 1 according to Embodiment 1 is described with reference to FIG. 1. FIG. 1 is a block diagram that schematically illustrates an example of the structure of the fuel cell system 1 according to Embodiment 1. The fuel cell system 1 includes a fuel cell unit 50, a desulfurizer 11, a combustion exhaust gas container 10, a purifier 12, and a second air heat exchanger 13.

The desulfurizer 11 is a reactor that removes a sulfur compound in raw material gas and includes a desulfurization catalyst 11a.

When a hydrodesulfurization catalyst is used as the desulfurization catalyst, examples of the desulfurization catalyst 11a include a CuZn-based desulfurization catalyst that has both a function of changing a sulfur compound into hydrogen sulfide and a function of adsorbing the hydrogen sulfide. The CuZn-based desulfurization catalyst exerts a desulfurization function in a temperature range of, for example, 100° C. to 400° C., or desirably of 150° C. to 300° C. The CuZn-based desulfurization catalyst serves to perform physical adsorption mainly at a low temperature and perform chemical adsorption ($H_2S+ZnO \rightarrow H_2O+ZnS$) at a high temperature. In this case, the amount of the sulfur contained in the raw material gas after the desulfurization is equal to or less than 1 vol parts per billion (ppb) and is normally equal to or less than 0.1 vol ppb.

The desulfurization catalyst 11a is not limited to the present example. For example, the sulfur compound in the raw material gas may be constituted of a CoMo-based catalyst for change into hydrogen sulfide and a ZnO-based catalyst or a CuZn-based catalyst, which is provided downstream of the CoMo-based catalyst and is a sulfur adsorbent that adsorbs and removes the hydrogen sulfide. The temperature range suitable for the hydrodesulfurization reaction of the CuZn-based catalyst is 150° C. to 350° C., or desirably 250° C. to 350° C.

When an absorbent desulfurization catalyst whose activity increases at high temperatures is used as the desulfurization catalyst, examples of the desulfurization catalyst 11a include an Ag-based desulfurization catalyst, a Cu-based desulfurization catalyst, an Fe-based desulfurization catalyst, and an Ni-based desulfurization catalyst. Zeolite, silica, manganese oxide, zirconia, or the like may be used as a support that supports such desulfurization catalysts. In increasing the activity of such desulfurization catalysts, it is desirable that heating is performed to a temperature equal to or higher than 100° C. while an upper limit of the temperature is equal to or lower than 350° C.

Although, as described above, the desulfurization catalyst may be a hydrodesulfurization catalyst or may be an absorbent desulfurization catalyst whose activity increases at high temperatures, the hydrodesulfurization catalyst is described as the desulfurization catalyst hereinafter.

Examples of the raw material include urban gas whose principal constituent is natural gas.

A first raw material supply passage 17a is connected to a lower portion of the desulfurizer 11, and a second raw material supply passage 17b is connected to an upper portion of the desulfurizer 11. Accordingly, the first raw material supply passage 17a and the second raw material supply passage 17b are linked to each other via the desulfurizer 11. A recycling passage 18 is connected to the first raw material supply passage 17a.

The combustion exhaust gas container 10 accommodates the desulfurizer 11 inside the combustion exhaust gas container 10 and is a container for heating the desulfurizer 11 with the combustion exhaust gas. A first combustion exhaust gas passage 15a1 (the combustion exhaust gas passage) is connected to an upper portion of the combustion exhaust gas container 10 and a second combustion exhaust gas passage 15a2 (the combustion exhaust gas passage) is connected to a lower portion of the combustion exhaust gas container 10. A gap is provided between an inner surface of the combustion exhaust gas container 10 and an outer surface of the desulfurizer 11, and the first combustion exhaust gas passage 15a1 and the second combustion exhaust gas passage 15a2 are connected through the gap. The gap between the combustion exhaust gas container 10 and the desulfurizer 11 is desirably uniform around the total periphery of the desulfurizer 11.

The purifier 12 is a reactor that removes a component included in the combustion exhaust gas, such as carbon monoxide or hydrocarbon, and includes a combustion catalyst 12a. For example, the combustion catalyst 12a is obtained by causing a Pt-based precious-metal catalyst to be supported on honeycomb-like ceramic, and a temperature suitable for the reaction is, for example, 250° C. The purifier 12 is provided beside the combustion exhaust gas container 10. The second combustion exhaust gas passage 15a2 is connected to a lower portion of the purifier 12, and a combustion exhaust gas emission passage 15b (the combustion exhaust gas passage) is connected to an upper portion of the purifier 12.

The second air heat exchanger 13 is a heat exchanger (the air heat exchanger), which performs heat exchange of the combustion exhaust gas and air supplied to the fuel cell unit 50 (the electric-power generation air). The second air heat exchanger 13 is provided beside the combustion exhaust gas container 10 and above the purifier 12. The combustion exhaust gas emission passage 15b and an air supply passage 16 penetrate the second air heat exchanger 13. The air supply passage 16 is arranged at a position farther away from the combustion exhaust gas container 10 than the combustion exhaust gas emission passage 15b. The combustion exhaust gas emission passage 15b and the air supply passage 16 extend in parallel. In the portions where the combustion exhaust gas emission passage 15b and the air supply passage 16 extend in parallel, the direction in which the combustion exhaust gas flows through the combustion exhaust gas emission passage 15b and the direction in which the electric-power generation air flows through the air supply passage 16 are opposite directions.

The fuel cell unit 50 is an electric-power generator and includes a casing 50a. The first combustion exhaust gas passage 15a1, the second raw material supply passage 17b, the air supply passage 16, and the recycling passage 18 are connected to the fuel cell unit 50. When the hydrodesulfurization catalyst is not used as the desulfurization catalyst, the recycling passage 18 is not provided.

A first heat insulator 21 is a heat insulator that covers the casing 50a of the fuel cell unit 50. A second heat insulator 22 is a heat insulator that covers each of the combustion exhaust gas container 10, the purifier 12, and the second air heat exchanger 13. The first heat insulator 21 and the second heat insulator 22 are provided so as to be adjacent to each other.

As described above, a space surrounded by the first heat insulator 21 (the first heat insulation space) and a space surrounded by the second heat insulator 22 (the second heat insulation space) are provided in the fuel cell system 1. The fuel cell unit 50 is accommodated in the first heat insulation space while the combustion exhaust gas container 10, the purifier 12, and the second air heat exchanger 13 are accommodated in the second heat insulation space. The second heat insulation space is a single space where the combustion exhaust gas container 10, the purifier 12, and the second air heat exchanger 13 are coupled through the second combustion exhaust gas passage 15a2 and the combustion exhaust gas emission passage 15b.

The first heat insulation space and the second heat insulation space are coupled to each other through the first combustion exhaust gas passage 15a1, the air supply passage 16, the second raw material supply passage 17b, and the recycling passage 18.

Figure 2:
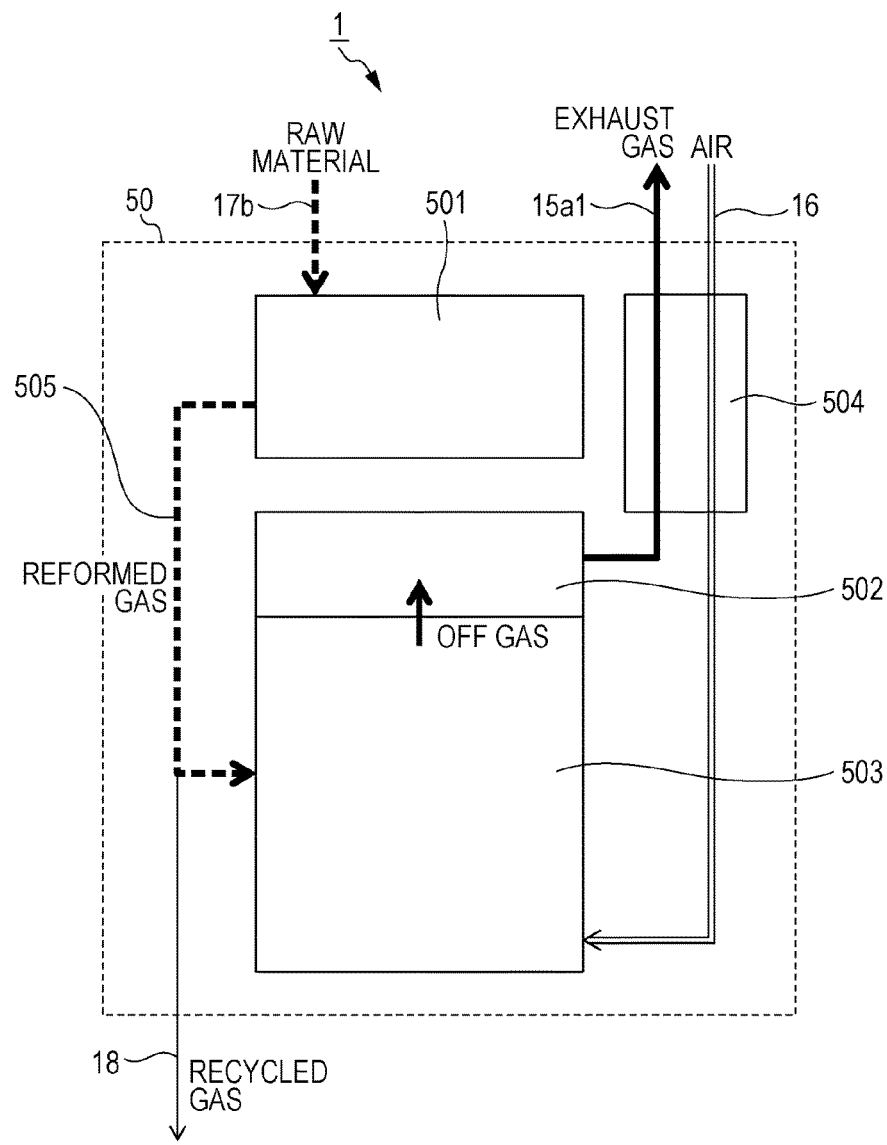
FIG. 2 is a block diagram that schematically illustrates a structure of the fuel cell unit in FIG. 1.

A structure of the fuel cell unit 50 is now described with reference to FIG. 2. FIG. 2 is a block diagram that schematically illustrates the structure of the fuel cell unit 50 in FIG. 1. The fuel cell unit 50 is a so-called hot module where a reformer 501, a combustor 502, a fuel cell 503, and a first air heat exchanger 504 are incorporated into the casing 50a. Although a solid oxide fuel cell (SOFC) is described as an example of the fuel cell 503 in the present embodiment, the fuel cell 503 is not limited to the SOFC. Since the reformer 501, the combustor 502, the fuel cell 503, and the first air heat exchanger 504 of the fuel cell unit 50 are known, the detailed explanations thereof are omitted.

The reformer 501 is a reactor that reforms a raw material and generates fuel. The second raw material supply passage 17b and a fuel supply passage 505 are connected to the reformer 501. When the reformer 501 reforms the raw material by water vapor reforming, a water passage for supplying water from the outside, which is not illustrated, may be connected to the reformer 501.

The fuel cell 503 is an electric-power generator that utilizes the fuel and the electric-power generation air, and generates electric power through an electrochemical reaction. The fuel supply passage 505 and the air supply passage 16 are connected to the fuel cell 503. The combustor 502 combusts the fuel not utilized in the electrochemical reaction of the fuel cell 503, which is referred to as off gas. The first air heat exchanger 504 is a heat exchanger (the main air heat exchanger) and performs the heat exchange of the combustion exhaust gas and the electric-power generation air. The first combustion exhaust gas passage 15a1 and the air supply passage 16 penetrate the first air heat exchanger 504.

Referring now to FIGS. 1 and 2, operation of the fuel cell system 1 is described below. As illustrated in FIG. 2, the raw material is supplied to the reformer 501 via the second raw material supply passage 17b and reformed into the fuel, which is referred to as reformed gas. The fuel is supplied to the fuel cell 503 via the fuel supply passage 505. The fuel left without being supplied to the fuel cell 503, which is referred to as recycled gas, is supplied to the desulfurizer 11 illustrated in FIG. 1 via the fuel supply passage 505 and the recycling passage 18. The recycling passage 18 is a passage that branches from the fuel supply passage 505.

The electric-power generation air is supplied to the fuel cell 503 via the air supply passage 16. The electric-power generation is performed using the fuel and the electric-power generation air. The off gas not utilized in the electric-power generation is supplied to the combustor 502 and combusted. The hot module in the casing 50a covered with the first heat insulator 21 illustrated in FIG. 1 is heated by the combustion heat to, for example, a temperature between 600° C. and 800° C. The temperature is a suitable temperature of the catalyst of the reformer 501 or the fuel cell 503.

The combustion exhaust gas generated as a result of the combustion of the off gas is emitted in the casing 50a and flows into the first combustion exhaust gas passage 15a1 of the first air heat exchanger 504. The temperature of the combustion exhaust gas at the time is, for example, 600° C. The high-temperature combustion exhaust gas heats the electric-power generation air from the air supply passage 16 in the first air heat exchanger 504. The heated electric-power generation air is supplied to the fuel cell 503 and used for the electric-power generation.

The combustion exhaust gas that has passed through the first air heat exchanger 504 is supplied from the fuel cell unit 50 in the first heat insulation space to the combustion exhaust gas container 10 in the second heat insulation space via the first combustion exhaust gas passage 15a1 as illustrated in FIG. 1. The temperature of the combustion exhaust gas at the time of being supplied to the combustion exhaust gas container 10 is, for example, between 300° C. and 350° C. The combustion exhaust gas passes through the gap between the inner surface of the combustion exhaust gas container 10 and the outer surface of the desulfurizer 11. During the passage, the combustion exhaust gas flows uniformly along the outer surface of the desulfurizer 11, and the desulfurization catalyst 11a is evenly heated by the thermal energy of the combustion exhaust gas. Accordingly, the desulfurization catalyst 11a of the desulfurizer 11 is heated to the suitable temperature of the desulfurization catalyst 11a, which is for example, a temperature between 200° C. and 300° C.

The raw material is supplied to the desulfurizer 11 via the first raw material supply passage 17a. The recycled gas is supplied from the fuel cell unit 50 to the desulfurizer 11 via the recycling passage 18 and the first raw material supply passage 17a. In the presence of the desulfurization catalyst 11a heated to the suitable temperature, the sulfur compound in the raw material reacts to the hydrogen in the recycled gas, and the resultant substance of the reaction is physically adsorbed. Accordingly, the sulfur compound included in the raw material is removed. The raw material from which the sulfur compound is removed as described above passes through the second raw material supply passage 17b and is transferred to the reformer 501 of the fuel cell unit 50. The raw material is reformed in the reformer 501.

The combustion exhaust gas emitted from the combustion exhaust gas container 10 is supplied to the purifier 12 through the second combustion exhaust gas passage 15a2. The temperature of the combustion exhaust gas at the time is, for example, between 200° C. and 250° C. While the combustion exhaust gas passes through the purifier 12, the combustion catalyst 12a is heated to, for example, 250° C., which is the suitable temperature of the combustion catalyst 12a. In the presence of the combustion catalyst 12a heated to the suitable temperature, a component in the combustion exhaust gas, such as carbon monoxide, undergoes oxidative decomposition. Thus, the combustion exhaust gas from which the component, such as the carbon monoxide, is removed, is emitted, through the combustion exhaust gas emission passage 15b, from the purifier 12 to the outside of the fuel cell system 1 via the second air heat exchanger 13.

The temperature of the combustion exhaust gas at the time when the combustion exhaust gas flows into the second air heat exchanger 13 is, for example, 200° C. The electric-power generation air at an ordinary temperature, which is for example, 25° C., flows into the second air heat exchanger 13 from the outside. The electric-power generation air is heated by the high-temperature combustion exhaust gas while passing through the second air heat exchanger 13. The electric-power generation air is heated to, for example, a temperature between 100° C. and 200° C. and transferred out from the second air heat exchanger 13 to the fuel cell unit 50.

The heated electric-power generation air flows into the first air heat exchanger 504 of the fuel cell unit 50 illustrated in FIG. 2. In the first air heat exchanger 504, the electric-power generation air is heated to a higher temperature by the high-temperature combustion exhaust gas of, for example, 600° C. After that, the electric-power generation air is utilized for the electric-power generation of the fuel cell 503.

According to the above-described embodiment, the fuel cell unit 50 is arranged in the first heat insulation space covered with the first heat insulator 21, and is thermally insulated from the outside of the first heat insulation space. Accordingly, the heat generated through the combustion of the combustor 502, which is the combustion heat, and the heat of the combustion exhaust gas can be prevented from dispersing outside. Thus, the combustion heat can be effectively utilized for the reaction of the reformer 501 or the fuel cell 503. In addition, the heat of the combustion exhaust gas can be utilized to heat the electric-power generation air. As a result, high efficiency of the electric-power generation and high efficiency of the heat utilization of the fuel cell system 1 can be maintained.

The combustion exhaust gas container 10, the purifier 12, the second air heat exchanger 13, the second combustion exhaust gas passage 15a2, and the combustion exhaust gas emission passage 15b are arranged in the second heat insulation space surrounded by the second heat insulator 22, and are thermally insulated from the outside of the second heat insulator 22. Thus, the heat of the second heat insulation space can be prevented from dispersing outside. Accordingly, the desulfurizer 11 and the purifier 12 in the combustion exhaust gas container 10 can be maintained at the respective suitable temperatures of the catalysts 11a and 12a. As a result, decrease in the efficiency of the electric-power generation in the fuel cell unit 50 can be suppressed by removing a sulfur compound in the raw material in the desulfurizer 11. The reliability of the fuel cell system 1 can be increased by removing a component, such as the carbon monoxide in the combustion exhaust gas, more surely in the purifier 12.

Further, the combustion exhaust gas container 10, the purifier 12, and the second air heat exchanger 13 are linked through the second combustion exhaust gas passage 15a2 and the combustion exhaust gas emission passage 15b. Thus, the heat of the combustion exhaust gas that flows through each of the second combustion exhaust gas passage 15a2 and the combustion exhaust gas emission passage 15b can be utilized for the heating in each part. The efficiency of the heat utilization of the fuel cell system 1 can be increased accordingly.

As described above, the high-temperature combustion heat of the combustor 502 is utilized to heat the first heat insulation space to the suitable temperature of each of the catalysts of the reformer 501 and the fuel cell 503, which is for example, a high temperature between 600° C. and 800° C. The heat of the combustion exhaust gas lower in temperature than the combustion heat is utilized to heat the second heat insulation space to the suitable temperature of each of the catalyst 11a of the desulfurizer 11 and the catalyst 12a of the purifier 12, which is for example, a temperature between 200° C. and 300° C. In addition, the first heat insulation space and the second heat insulation space are thermally insulated from each other. Accordingly, the heat of the first heat insulation space can be prevented from directly moving to the second heat insulation space because of thermal conduction or radiation. Consequently, the catalysts 11a and 12a in the second heat insulation space can be heated to the respective suitable temperatures while maintaining the first heat insulation space at a high temperature. As a result, increase in the efficiency of the heat utilization of the fuel cell system 1, suppression of decrease in the efficiency of the electric-power generation of the fuel cell 503, and safe operation of the fuel cell system 1 can be achieved.

The purifier 12 is provided downstream of the combustion exhaust gas container 10. The suitable temperature of the combustion catalyst 12a of the purifier 12 is lower than the suitable temperature of the desulfurization catalyst 11a of the desulfurizer 11. Thus, when the combustion exhaust gas heats the purifier 12 after heating the desulfurizer 11, the catalysts 11a and 12a can be heated to the respective suitable temperatures.

The combustion exhaust gas container 10, the purifier 12, and the second air heat exchanger 13 are arranged near one another. The fuel cell system 1 can be downsized accordingly. Further, decrease in the efficiency of the heat utilization of the fuel cell system 1 can be suppressed by reducing heat dispersion in the passages 15a2 and 15b that connect the combustion exhaust gas container 10, the purifier 12, and the second air heat exchanger 13.

Moreover, the air supply passage 16 passes through the second air heat exchanger 13 and the first air heat exchanger 504. Accordingly, the electric-power generation air that flows through the air supply passage 16 is heated in the second air heat exchanger 13 by the low-temperature combustion exhaust gas, which is for example, 200° C., and after that, heated in the first air heat exchanger 504 by the high-temperature combustion exhaust gas, which is for example, 600° C. The electric-power generation air can be heated to a temperature necessary for the electric-power generation of the high-temperature fuel cell 503.

Decrease in the temperature of the combustion exhaust gas in the first air heat exchanger 504 can be suppressed so as to be smaller than the decrease in the temperature of the combustion exhaust gas, which occurs when the air supply passage 16 is caused to pass through the first air heat exchanger 504 instead of being caused to pass through the second air heat exchanger 13. Accordingly, the combustion exhaust gas that flows from the first air heat exchanger 504 into the combustion exhaust gas container 10 can be maintained at a high temperature, and the desulfurization catalyst 11a and the combustion catalyst 12a can be heated to the respective suitable temperatures by the combustion exhaust gas.

Although in the above-described structure, the fuel cell unit 50 includes the reformer 501, the reformer 501 may be omitted in the fuel cell unit 50. When the fuel cell 503 is an SOFC for example, the operating temperature of the fuel cell 503 is high, which is for example, between 600° C. and 800° C. Thus, water vapor reforming (internal reforming) may be performed in the fuel cell 503 using a catalytic action of nickel, which is a principal constituent of a fuel electrode of the fuel cell 503. In this case, for example, a passage that guides hydrogen from the outside to the first raw material supply passage 17a is provided instead of the recycling passage 18. Accordingly, a mixed gas obtained by mixing the raw material and the hydrogen can be supplied to the desulfurizer 11 via the first raw material supply passage 17a.

[Variation 1]

Figure 3:
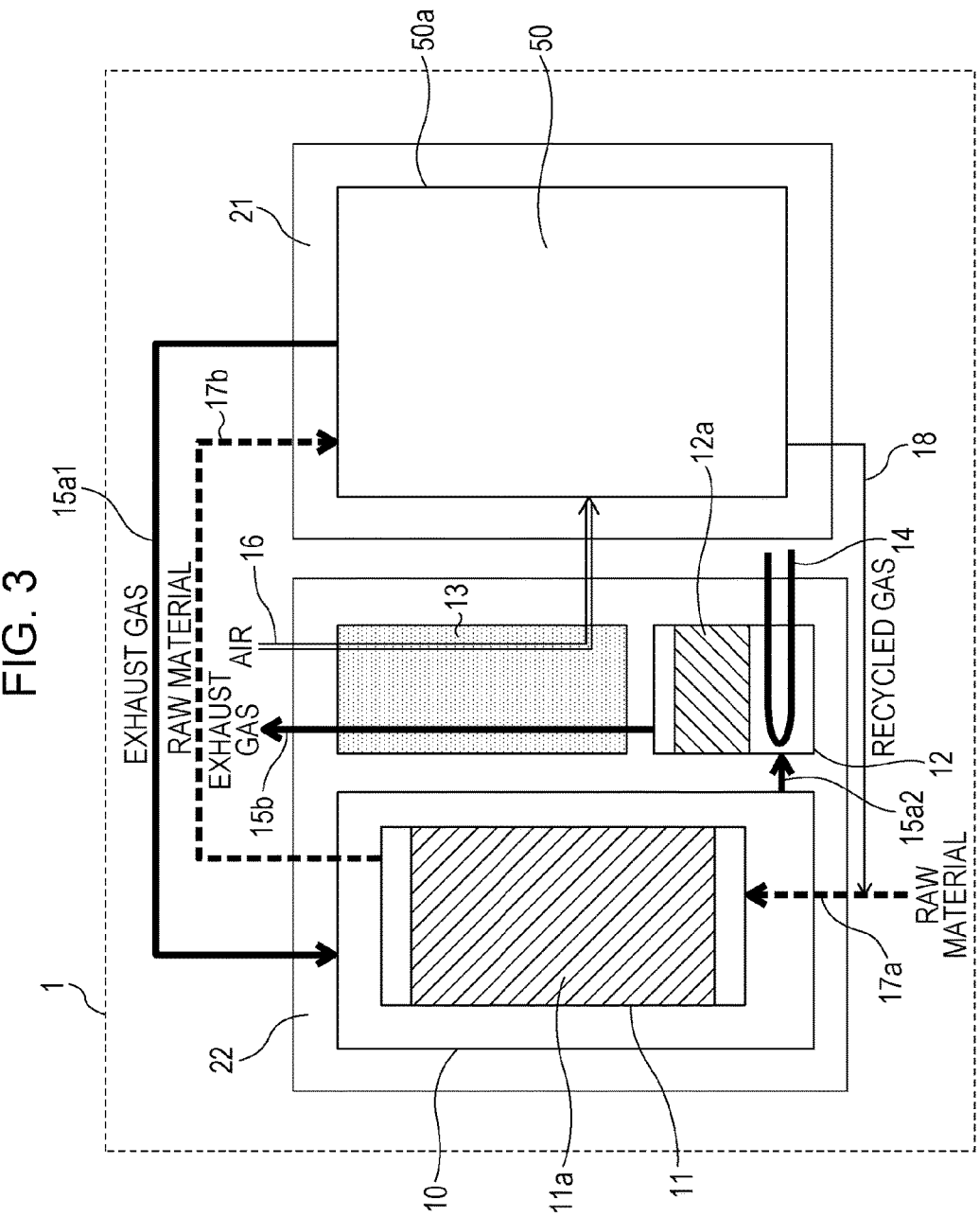
FIG. 3 is a block diagram that schematically illustrates an example of an internal structure of a second heat insulator according to Variation 1 of Embodiment 1 of the present disclosure.

The fuel cell system 1 according to Variation 1 of Embodiment 1 further includes a heater 14. As illustrated in FIG. 3, the heater 14 is a heater for heating the combustion catalyst 12a of the purifier 12, and for example, an electric heater is used as the heater 14. The heater 14 is provided between the second combustion exhaust gas passage 15a2 and the combustion catalyst 12a.

The heater 14 enables the combustion exhaust gas that flows from the second combustion exhaust gas passage 15a2 into the purifier 12 to be heated. Accordingly, when the temperature of the combustion catalyst 12a at the time of, for example, starting the fuel cell system 1 up is lower than the suitable temperature of the combustion catalyst 12a, the combustion catalyst 12a can be heated to the suitable temperature in a short time. As a result, the temperature of the combustion catalyst 12a can be made stable and the temperature raising time of the combustion catalyst 12a can be reduced.

In the above-described structure, the heater 14 is provided in the purifier 12. The heater 14 may be provided in at least one of the purifier 12, the combustion exhaust gas container 10, and the second air heat exchanger 13. When the temperature of one of the purifier 12, the combustion exhaust gas container 10, and the second air heat exchanger 13 is lower than a desired temperature, the heater 14 can heat each of the desulfurizer 11, the purifier 12, and the second air heat exchanger 13 to the desired temperature.

[Variation 2]

Figure 4:
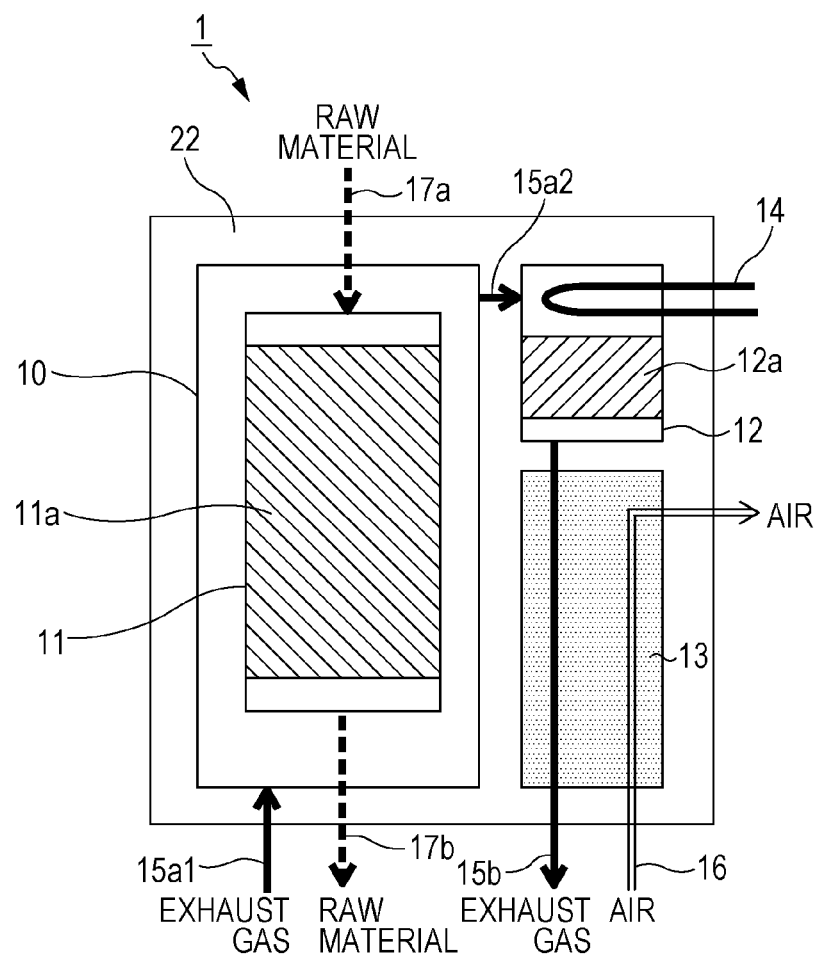
FIG. 4 is a block diagram that schematically illustrates an example of an internal structure of a second heat insulator according to Variation 2 of Embodiment 1 of the present disclosure.

The arrangement of the combustion exhaust gas container 10, the purifier 12, and the second air heat exchanger 13 in the second heat insulation space is not limited to the above-described arrangement illustrated in FIG. 1. For example, the combustion exhaust gas container 10, the purifier 12, and the second air heat exchanger 13 may be arranged as illustrated in FIG. 4. FIG. 4 is a block diagram that schematically illustrates an example of a structure of the second heat insulator 22 according to Variation 2 of Embodiment 1 in the second heat insulation space.

In the example of FIG. 4, the first combustion exhaust gas passage 15a1 is connected to the lower portion of the combustion exhaust gas container 10. The first raw material supply passage 17a is connected to the upper portion of the desulfurizer 11, and the second raw material supply passage 17b is connected to a lower portion of the desulfurizer 11. The combustion exhaust gas emission passage 15b extends from the second heat insulation space to the lower portion of the second heat insulator 22. The air supply passage 16 is inserted in the second heat insulation space from the lower portion of the second heat insulator 22. The purifier 12 is arranged above the second air heat exchanger 13.

As described above, the arrangement of the combustion exhaust gas container 10, the purifier 12, the second air heat exchanger 13, and each passage may be changed as desired within constraints of the design. The heater 14 according to Variation 1 of Embodiment 1 may be provided.

[Variation 3]

Figure 5:
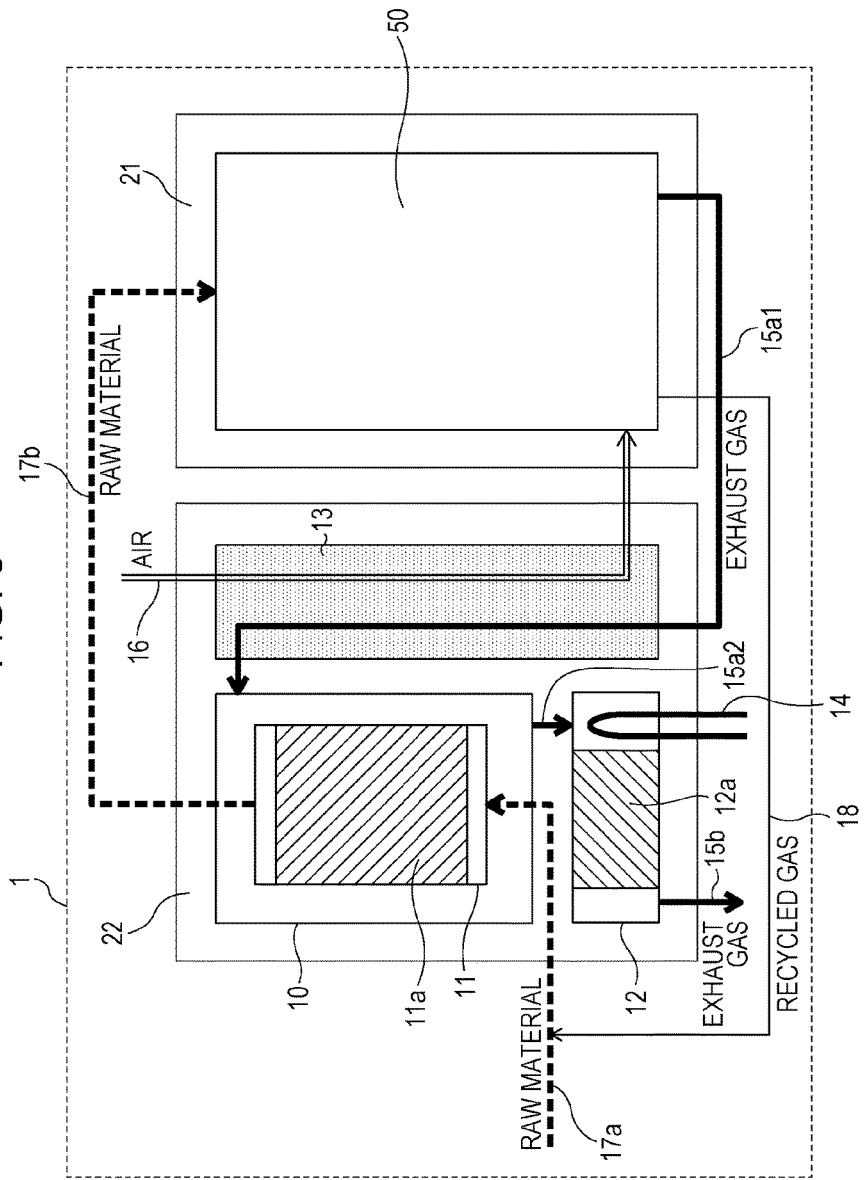
FIG. 5 is a block diagram that schematically illustrates an example of a structure of the fuel cell system according to Variation 3 of Embodiment 1 of the present disclosure.
Figure 6:
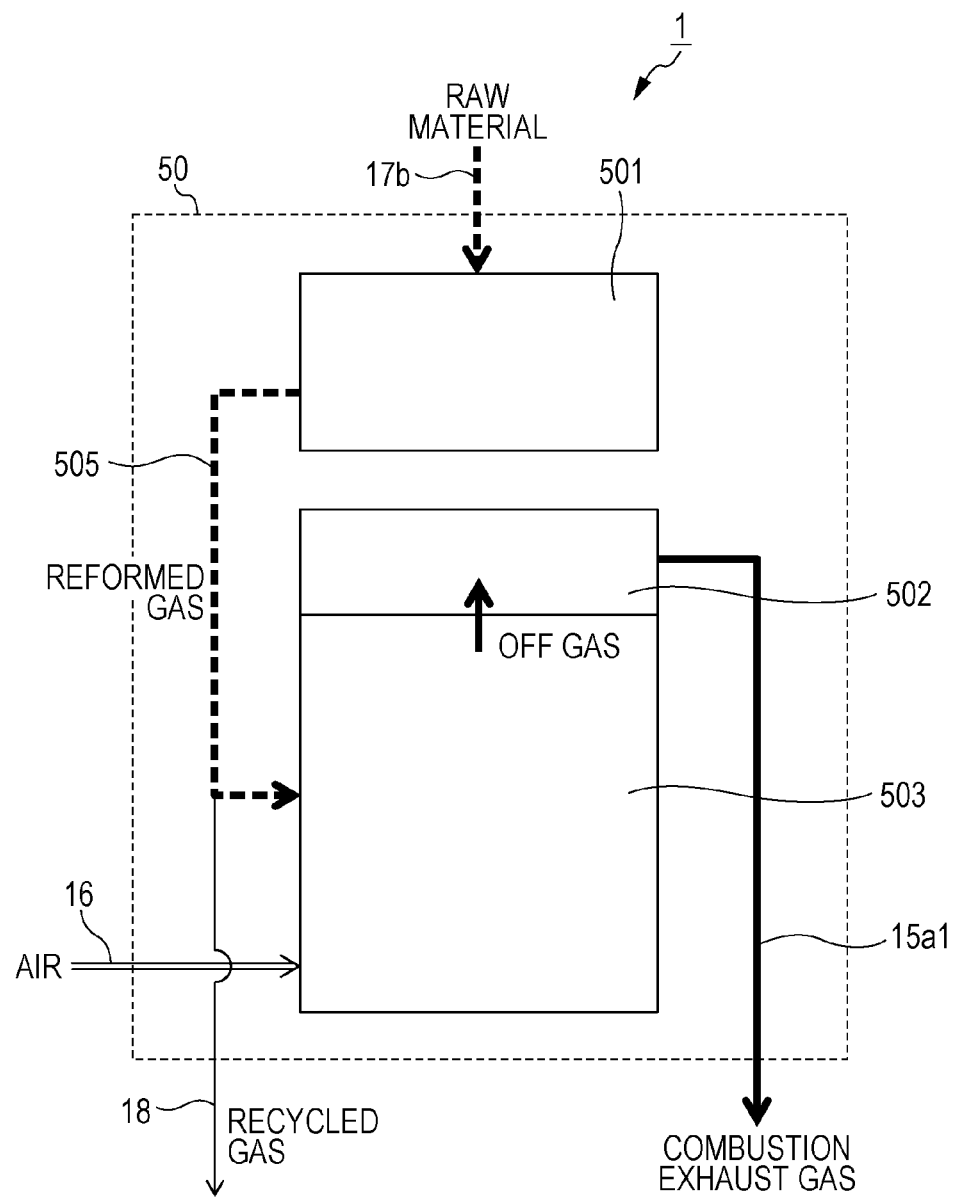
FIG. 6 is a block diagram that schematically illustrates a structure of the fuel cell unit in FIG. 5.

In the structure in FIG. 1, the combustion exhaust gas emission passage 15b passes through the second air heat exchanger 13, and as illustrated in FIG. 2, the fuel cell unit 50 is provided with the first air heat exchanger 504. In contrast, in the fuel cell system 1 according to Variation 3 of Embodiment 1, as illustrated in FIG. 5, the first combustion exhaust gas passage 15a1 passes through the second air heat exchanger 13, and as illustrated in FIG. 6, the fuel cell unit 50 is not provided with the first air heat exchanger 504. FIG. 5 is a block diagram that schematically illustrates an example of a structure of the fuel cell system 1 according to Variation 3 of Embodiment 1. FIG. 6 is a block diagram that schematically illustrates the structure of the fuel cell unit 50 in FIG. 5. Also in the fuel cell system 1 according to Variation 3 of Embodiment 1, the heater 14 according to Variation 1 of Embodiment 1 may be provided.

As illustrated in FIGS. 5 and 6, a raw material supplier outside the fuel cell system 1 is connected to the desulfurizer 11 through the first raw material supply passage 17a. The desulfurizer 11 is connected to the reformer 501 of the fuel cell unit 50 through the second raw material supply passage 17b. The reformer 501 is connected to the fuel cell 503 through the fuel supply passage 505. The recycling passage 18 that branches from the fuel supply passage 505 is connected to the first raw material supply passage 17a.

The casing 50a of the fuel cell unit 50 is connected to the combustion exhaust gas container 10 through the first combustion exhaust gas passage 15a1. Between the casing 50a and the combustion exhaust gas container 10, the first combustion exhaust gas passage 15a1 passes through the second air heat exchanger 13.

The combustion exhaust gas container 10 is connected to the purifier 12 through the second combustion exhaust gas passage 15a2. The purifier 12 is connected to the combustion exhaust gas emission passage 15b, and the combustion exhaust gas emission passage 15b extends to the outside of the fuel cell system 1.

Further, the air supply passage 16 is inserted in the second heat insulation space from the outside of the fuel cell system 1, and passes through the second air heat exchanger 13 to be connected to the fuel cell 503 of the fuel cell unit 50.

In the structure illustrated in FIGS. 5 and 6, the temperature of the combustion exhaust gas from the fuel cell unit 50 that does not include the first air heat exchanger 504 illustrated in FIG. 2 is equal to or higher than, for example, 600° C., which is as high as the temperature of the fuel cell 503. The combustion exhaust gas is led to the second air heat exchanger 13 and undergoes heat exchange with the electric-power generation air that flows through the air supply passage 16. Accordingly, the electric-power generation air is heated to the operating temperature of the fuel cell 503, which is a high temperature of, for example, 600° C., and supplied to the fuel cell 503.

The combustion exhaust gas that has passed through the second air heat exchanger 13 undergoes heat exchange with the electric-power generation air at an ordinary temperature. Accordingly, the temperature of the combustion exhaust gas becomes suitable for the heating of the desulfurization catalyst 11a or the combustion catalyst 12a, which is for example, approximately 300° C. Then, the combustion exhaust gas flows into the combustion exhaust gas container 10 and heats the desulfurization catalyst 11a to the suitable temperature of the desulfurization catalyst 11a, which is for example, 300° C. After that, the combustion exhaust gas flows into the purifier 12 and heats the combustion catalyst 12a to the suitable temperature of the combustion catalyst 12a, which is for example, 250° C. In the presence of the combustion catalyst 12a, a component, such as carbon monoxide, is removed from the combustion exhaust gas and emitted to the outside of the fuel cell system 1 through the combustion exhaust gas emission passage 15b.

Since, according to the structure, the fuel cell unit 50 includes no air heat exchanger, the fuel cell system 1 can be downsized and costs can be reduced. The combustion exhaust gas does not pass through the air heat exchanger of the fuel cell unit 50. Thus, the passage of the combustion exhaust gas can be shortened and the heat dispersion of the combustion exhaust gas can be reduced. Thus, the efficiency of the heat utilization of the fuel cell system 1 can be increased.

Further, the combustion exhaust gas is caused to flow through the second air heat exchanger 13, the combustion exhaust gas container 10, and the purifier 12 in this order. Accordingly, the catalysts 11a and 12a and the electric-power generation air can be heated to the respective suitable temperatures.

[Variation 4]

Figure 7:
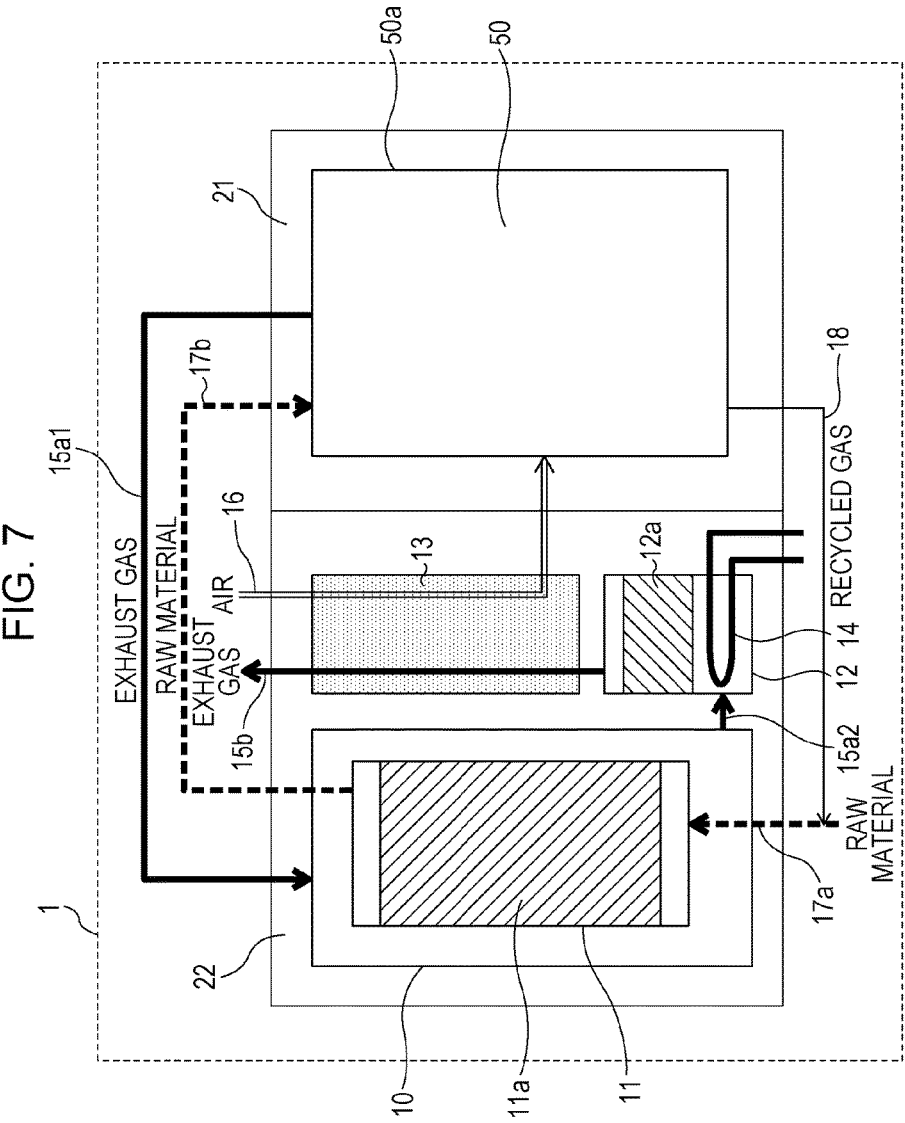
FIG. 7 is a block diagram that schematically illustrates an example of a structure of the fuel cell system according to Variation 4 of Embodiment 1 of the present disclosure.

In the fuel cell system 1 according to Variation 4 of Embodiment 1, as illustrated in FIG. 7, the first heat insulation space and the second heat insulation space are provided so as to be adjacent to each other via the first heat insulator 21 and the second heat insulator 22. Thus, the first heat insulation space and the second heat insulation space are thermally insulated from each other by the heat insulators so as not to allow heat to move from the first heat insulation space to the second heat insulation space due to thermal conduction or radiation. It is however possible for heat to move from the first heat insulation space to the second heat insulation space because of, for example, the combustion exhaust gas that flows through the first combustion exhaust gas passage 15a1. When the first heat insulation space and the second heat insulation space are individually provided so as to be adjacent to each other and are thermally insulated from each other by a heat insulator, the first heat insulator 21 and the second heat insulator 22 may be integrally provided.

Embodiment 2

Figure 8:
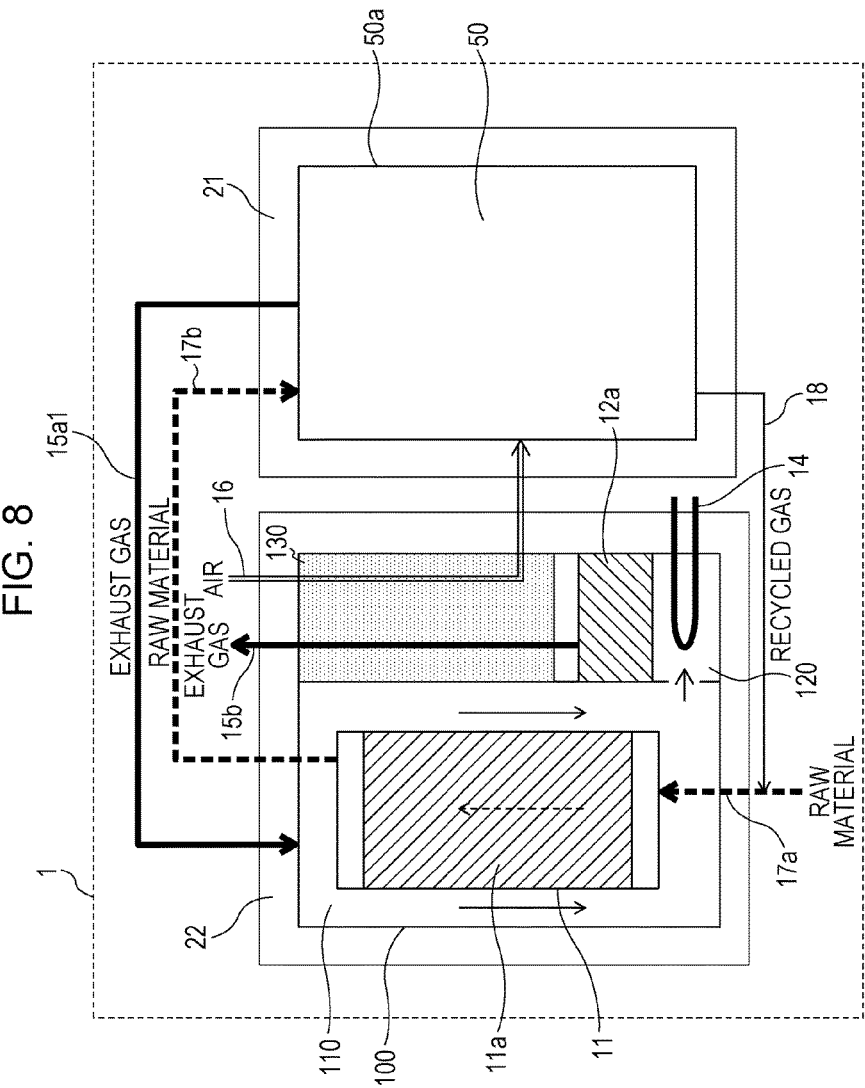
FIG. 8 is a block diagram that schematically illustrates an example of a structure of a fuel cell system according to Embodiment 2 of the present disclosure.
Figure 9:
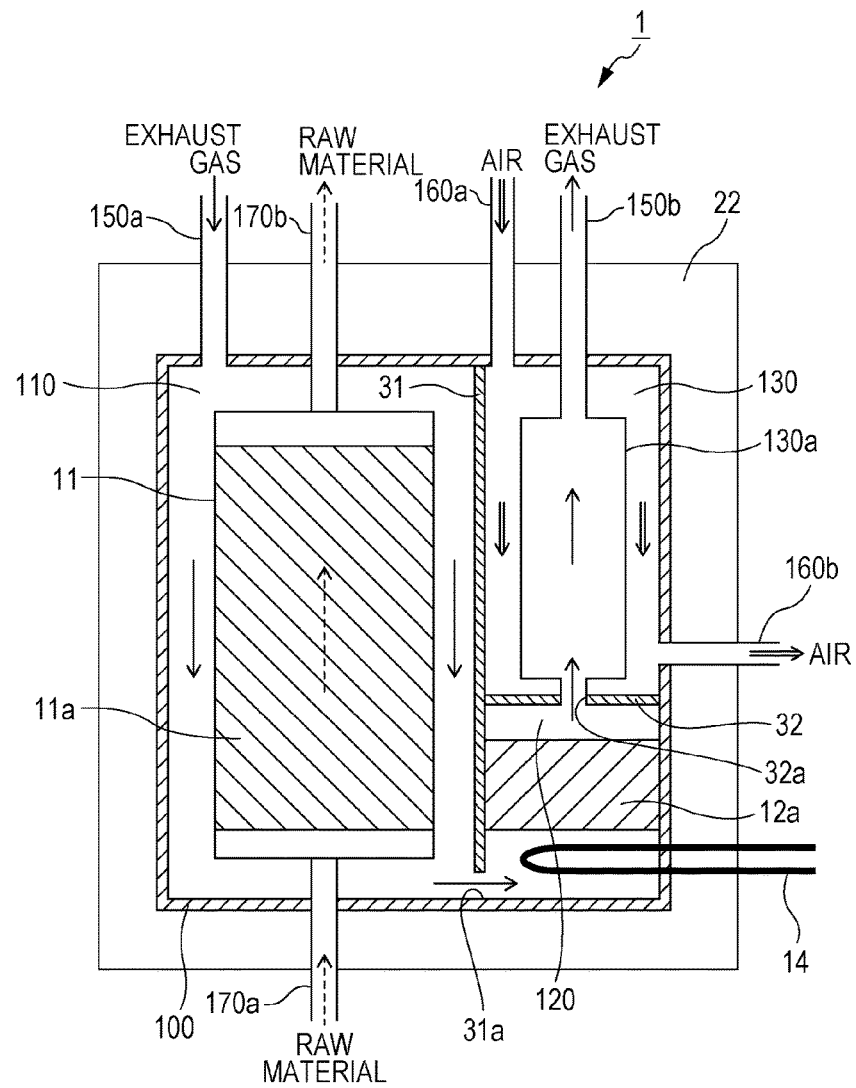
FIG. 9 is a block diagram that schematically illustrates an internal structure of the second heat insulator in FIG. 8.

A structure of a fuel cell system 1 according to Embodiment 2 is described with reference to FIGS. 8 and 9. FIG. 8 is a block diagram that schematically illustrates an example of the structure of the fuel cell system 1 according to Embodiment 2. FIG. 9 is a block diagram that schematically illustrates an example of a structure of a second heat insulator 22 illustrated in FIG. 8 in a second heat insulation space.

The second heat insulator 22 is provided among the combustion exhaust gas container 10, the purifier 12, and the second air heat exchanger 13 according to Embodiment 1. In Embodiment 1, the combustion exhaust gas container 10, the purifier 12, and the second air heat exchanger 13 are arranged independently in the second heat insulation space of the second heat insulator 22. In contrast, in the fuel cell system 1 according to Embodiment 2, a combustion exhaust gas container 10, a purifier 12, and a second air heat exchanger 13 are arranged in one integral container 100.

The integral container 100 is covered with the second heat insulator 22. The integral container 100 is provided with a first partition wall 31 (the partition wall) and a second partition wall 32 (the partition wall). The first partition wall 31 and the second partition wall 32 divide an inner space of the integral container 100 into three chambers, which are a combustion exhaust gas chamber 110, a purification chamber 120, and an air heat exchange chamber 130. While being divided by the first partition wall 31, the combustion exhaust gas chamber 110 and the purification chamber 120 communicate via a first communicating hole 31a provided through the first partition wall 31. Similarly, while being divided by the second partition wall 32, the purification chamber 120 and the air heat exchange chamber 130 communicate via a second communicating hole 32a provided through the second partition wall 32.

The combustion exhaust gas chamber 110 corresponds to the combustion exhaust gas container and accommodates a desulfurizer 11 filled with a desulfurization catalyst 11a inside the combustion exhaust gas chamber 110. A raw material inlet 170 is provided in a lower portion of the desulfurizer 11, and a raw material outlet 170b is provided in an upper portion of the desulfurizer 11. The raw material inlet 170a penetrates the second heat insulator 22, and is connected to a first raw material supply passage 17a linked to a raw material supplier, which is not illustrated. The raw material outlet 170b penetrates the second heat insulator 22, and is connected to a second raw material supply passage 17b linked to a fuel cell unit 50.

A gap is provided between an inner surface of the combustion exhaust gas chamber 110 and an outer surface of the desulfurizer 11. A combustion exhaust gas inlet 150a is provided in an upper portion of the combustion exhaust gas chamber 110, and the first communicating hole 31a is provided in a lower portion of the combustion exhaust gas chamber 110. The combustion exhaust gas inlet 150a penetrates the second heat insulator 22, and is connected to a first combustion exhaust gas passage 15a1 linked to the fuel cell unit 50. The gap between the combustion exhaust gas chamber 110 and the desulfurizer 11 communicates with the purification chamber 120 and the first combustion exhaust gas passage 15a1.

The purification chamber 120 corresponds to the purifier, and includes a combustion catalyst 12a and a heater 14 inside the purification chamber 120. The heater 14 is provided between the first communicating hole 31a and the combustion catalyst 12a.

The air heat exchange chamber 130 corresponds to the second air heat exchanger (the air heat exchanger), and includes a combustion exhaust gas passage portion 130a inside the air heat exchange chamber 130. A lower portion of the combustion exhaust gas passage portion 130a is connected to the second communicating hole 32a, and an upper portion of the combustion exhaust gas passage portion 130a is provided with a combustion exhaust gas outlet 150b. The combustion exhaust gas outlet 150b penetrates the second heat insulator 22 and is connected to the combustion exhaust gas emission passage 15b that extends to the outside of the fuel cell system 1. Accordingly, the combustion exhaust gas passage portion 130a communicates with the purification chamber 120 via the second communicating hole 32a, and communicates with the combustion exhaust gas emission passage 15b via the combustion exhaust gas outlet 150b. The combustion exhaust gas passage portion 130a constitutes part of the combustion exhaust gas emission passage 15b. The combustion exhaust gas outlet 150b may extend to the outside of the fuel cell system 1 instead of being connected to the combustion exhaust gas emission passage 15b that extends to the outside of the fuel cell system 1.

A gap is provided between an inner surface of the air heat exchange chamber 130 and an outer surface of the combustion exhaust gas passage portion 130a. An air inlet 160a is provided in an upper portion of the air heat exchange chamber 130, and an air outlet 160b is provided in a lower portion of the air heat exchange chamber 130. The air inlet 160a penetrates the second heat insulator 22 and is connected to an air supply passage 16 that extends to the outside of the fuel cell system 1. The air outlet 160b penetrates the second heat insulator 22 and is connected to the air supply passage 16 that extends to the fuel cell unit 50. Accordingly, the gap between the air heat exchange chamber 130 and the combustion exhaust gas passage portion 130a communicates with the air supply passage 16 via the air inlet 160a and the air outlet 160b, and constitutes part of the air supply passage 16. The air inlet 160a may extend to the outside of the fuel cell system 1 instead of being connected to the air supply passage 16 that extends to the outside of the fuel cell system 1.

In the fuel cell system 1 structured as described above, the raw material flows from the raw material supplier into the desulfurizer 11 via the raw material inlet 170a. The raw material from which a sulfur compound is removed in the desulfurizer 11 is transferred to the fuel cell unit 50 via the raw material outlet 170b and utilized for the electric-power generation.

The combustion exhaust gas emitted from the fuel cell unit 50 flows into the combustion exhaust gas chamber 110 via the combustion exhaust gas inlet 150a. The combustion exhaust gas flows uniformly along an outer surface of the desulfurizer 11. Accordingly, the desulfurization catalyst 11a is evenly heated to the suitable temperature of the desulfurization catalyst 11a, which is for example, between 200° C. and 300° C.

The combustion exhaust gas that has passed through the combustion exhaust gas chamber 110 flows into the purification chamber 120 via the first communicating hole 31a. The combustion exhaust gas heats the combustion catalyst 12a to the suitable temperature of the combustion catalyst 12a, which is for example, 250° C. In the presence of the combustion catalyst 12a, a component, such as carbon monoxide, is removed from the combustion exhaust gas.

The combustion exhaust gas flows into the combustion exhaust gas passage portion 130a of the air heat exchange chamber 130 via the second communicating hole 32a. The electric-power generation air flows from the outside of the fuel cell system 1 into the gap between the air heat exchange chamber 130 and the combustion exhaust gas passage portion 130a via the air inlet 160a. The electric-power generation air at an ordinary temperature, which flows through the gap, and the high-temperature combustion exhaust gas that flows through the combustion exhaust gas passage portion 130a undergo heat exchange. After that, the electric-power generation air is heated by the combustion exhaust gas and transferred to the fuel cell unit 50 via the air outlet 160b. The combustion exhaust gas after the heat exchange is emitted from the combustion exhaust gas outlet 150b to the outside of the fuel cell system 1.

According to the above-described embodiment, the combustion exhaust gas chamber 110, the purification chamber 120, and the air heat exchange chamber 130 are integrated and arranged inside the integral container 100. Accordingly, piping for coupling the chambers 110, 120, and 130 can be omitted. In addition, the walls of the chambers 110, 120, and 130 are shared and a heat insulator among the chambers 110, 120, and 130 can be omitted. Thus, the structure can be simplified and the fuel cell system 1 can be downsized. Because of the omission of the piping and the reduction in the surface area, the heat dispersion to the outside can be suppressed and the thermal energy of the combustion exhaust gas can be effectively utilized, and accordingly the efficiency of the heat utilization of the fuel cell system 1 can be further increased.

Since, similar to Embodiment 1, the fuel cell unit 50 is covered with a first heat insulator 21, the combustion heat of a first heat insulation space and the heat of the combustion exhaust gas can be prevented from dispersing outside. Since the integral container 100 that includes the chambers 110, 120, and 130 is covered with the second heat insulator 22, the heat of the combustion exhaust gas of the second heat insulation space can be prevented from dispersing outside. Further, the heat of the combustion exhaust gas can be utilized for the heating in the chambers 110, 120, and 130 by causing the combustion exhaust gas to flow to each of the chambers 110, 120, and 130. Since the first heat insulation space and the second heat insulation space are thermally insulated from each other, the first heat insulation space can be maintained at a high temperature. Moreover, since the combustion exhaust gas is caused to flow through the combustion exhaust gas chamber 110, the purification chamber 120, and the air heat exchange chamber 130 in this order, the catalysts 11a and 12a can be heated to the respective suitable temperatures. In addition, since the electric-power generation air is heated in the second air heat exchanger 13, the electric-power generation air can be heated to a temperature necessary for the electric-power generation of the high-temperature fuel cell 503.

The heater 14 may be provided in at least one of the purifier 12, the combustion exhaust gas container 10, and the second air heat exchanger 13. Further, similar to Embodiment 1, the heater 14 may be omitted in the fuel cell system 1. Similar to Variation 3 of Embodiment 1, the combustion exhaust gas may be caused to flow through the air heat exchange chamber 130, the combustion exhaust gas chamber 110, and the purification chamber 120 in this order while a first air heat exchanger 504 of the fuel cell unit 50 is not provided.

[Variation 1]

Figure 10:
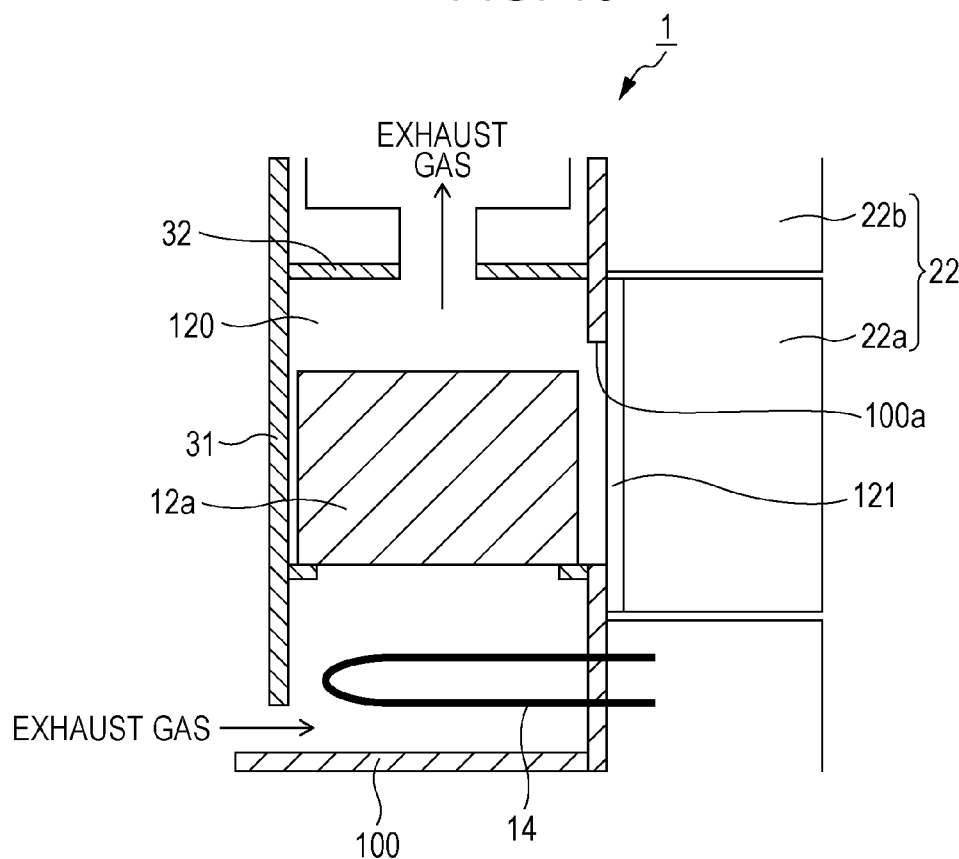
FIG. 10 is a block diagram that schematically illustrates structures of the purification chamber and the second heat insulator in FIG. 9.

As illustrated in FIG. 10, the fuel cell system 1 according to Variation 1 of Embodiment 2 further includes a lid 121 of the purification chamber 120. FIG. 10 is an enlarged diagram that illustrates part of the integral container 100 according to Variation 1 of Embodiment 2.

An opening 100a is provided through a wall of the integral container 100 that corresponds to the purification chamber 120. The lid 121 is provided to block the opening 100a so that the opening 100a is openable and closable. The lid 121 is screwed to, for example, the integral container 100. The second heat insulator 22 is separated into a portion that covers the lid 121, which is referred to as a covering portion 22a, and a body portion 22b that covers the integral container 100 excluding the lid 121.

To open the lid 121, the lid 121 and the covering portion 22a are removed together. Since the opening 100a is open accordingly, for example, a worker can easily replace (attach and detach) the combustion catalyst 12a of the purification chamber 120 through the opening 100a.

[Variation 2]

Figure 11:
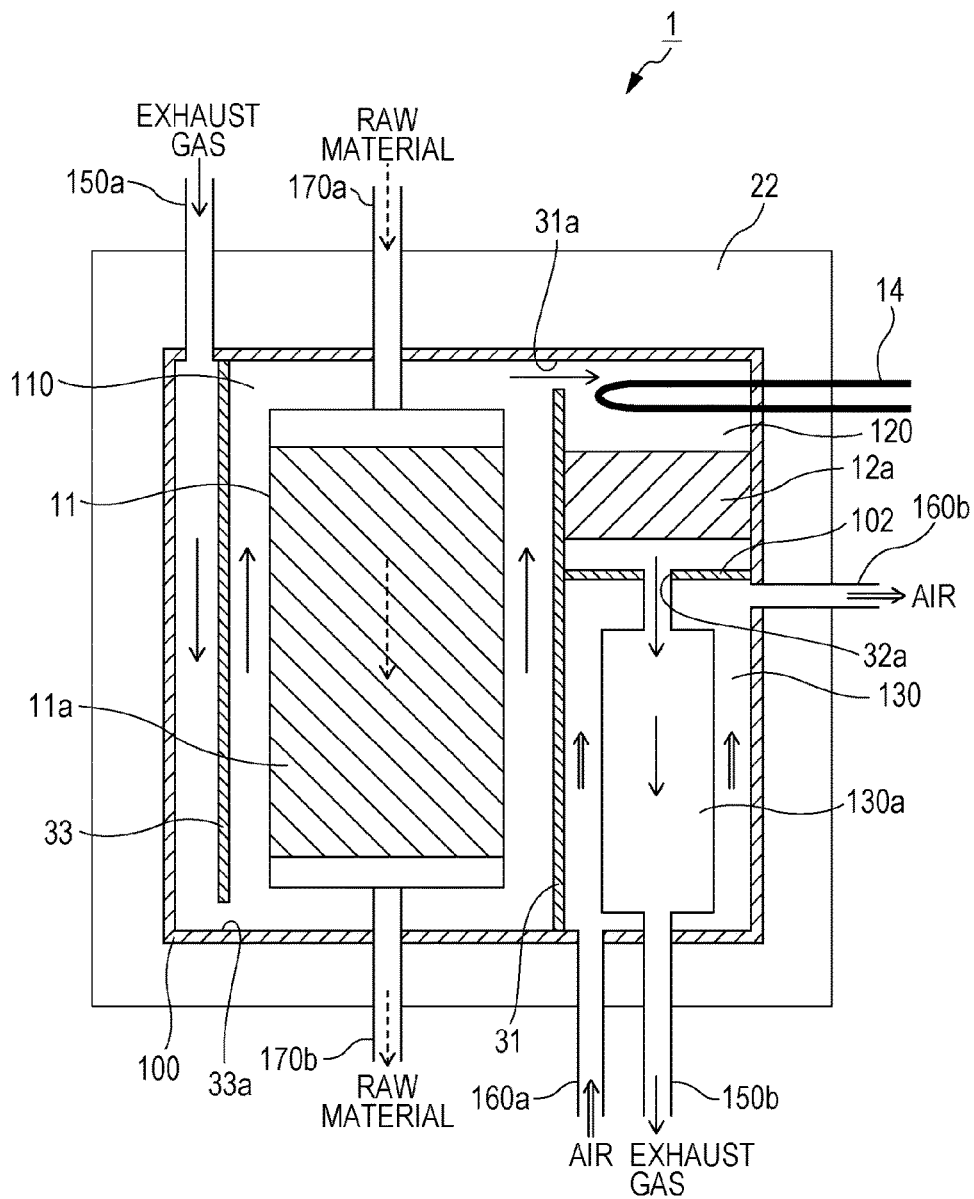
FIG. 11 is a block diagram that schematically illustrates an internal structure of an integral container according to Variation 2 of Embodiment 2 of the present disclosure.

The arrangement of the chambers 110, 120, and 130 in the second heat insulation space is not limited to the above-described arrangement illustrated in FIG. 9. For example, the chambers 110, 120, and 130 may be arranged as illustrated in FIG. 11. FIG. 11 is a block diagram that schematically illustrates an example of a structure of the second heat insulator 22 according to Variation 2 of Embodiment 2 in the second heat insulation space.

In the example of FIG. 11, the raw material inlet 170a is provided in the upper portion of the desulfurizer 11, and the raw material outlet 170b is provided in the lower portion of the desulfurizer 11. The combustion exhaust gas inlet 150a is provided in the upper portion of the combustion exhaust gas chamber 110, and the combustion exhaust gas outlet 150b is provided in the lower portion of the combustion exhaust gas passage portion 130a. The air inlet 160a is provided in the lower portion of the air heat exchange chamber 130.

A third partition wall 33 is provided between the combustion exhaust gas inlet 150a and the desulfurizer 11. The third partition wall 33 is provided in parallel with the outer surface of the desulfurizer 11. A third communicating hole 33a is provided through the third partition wall 33 and arranged near the wall of the integral container 100, which is far from the combustion exhaust gas inlet 150a. Accordingly, the combustion exhaust gas that flows from the combustion exhaust gas inlet 150a flows into the combustion exhaust gas chamber 110 through the third communicating hole 33a, and flows in the combustion exhaust gas chamber 110 in the opposite direction of the direction in which the raw material flows in the desulfurizer 11.

Further, the first communicating hole 31a is arranged near the wall of the integral container 100, which is far from the combustion exhaust gas outlet 150b. Accordingly, the purification chamber 120 linked to the first communicating hole 31a is arranged over the air heat exchange chamber 130 linked to the combustion exhaust gas outlet 150b. The air heat exchange chamber 130 is at the most downstream position of the flow of the combustion exhaust gas.

[Variation 3]

Figure 12:
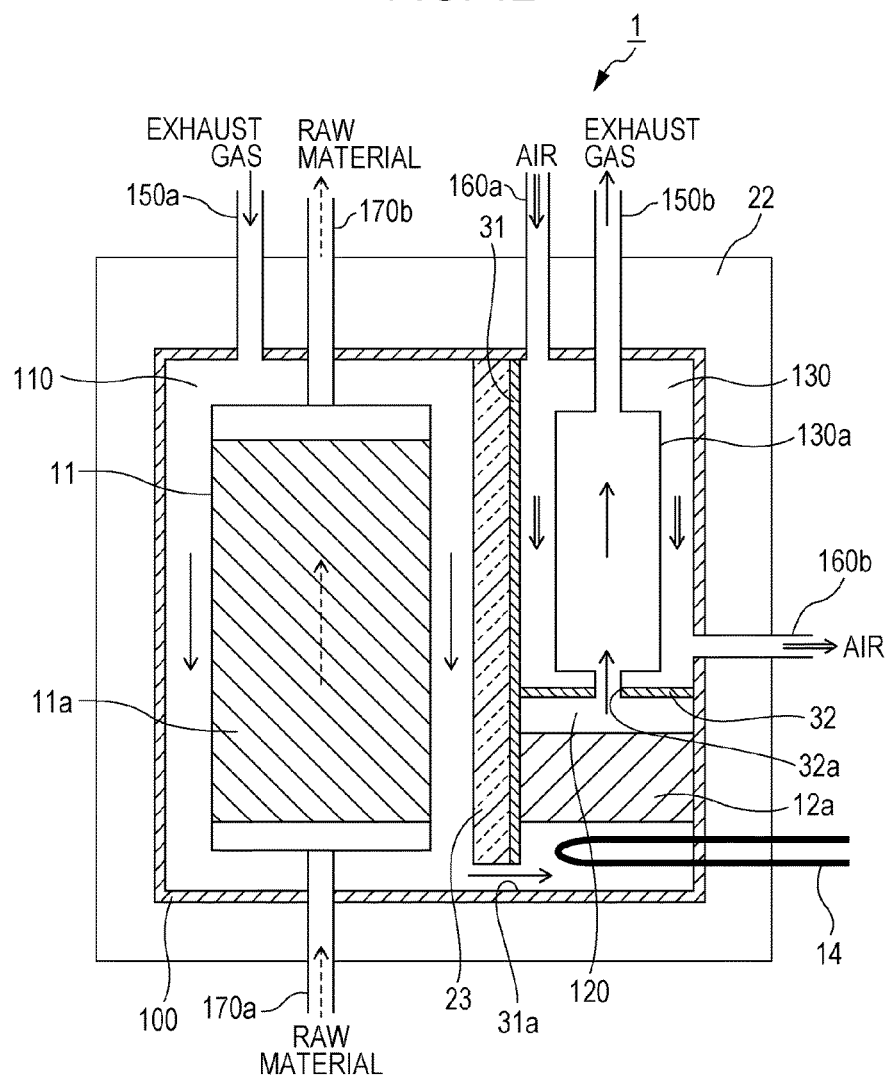
FIG. 12 is a block diagram that schematically illustrates an internal structure of the integral container according to Variation 3 of Embodiment 2 of the present disclosure.

As illustrated in FIG. 12, the fuel cell system 1 according to Variation 3 of Embodiment 2 further includes a heat-insulating material 23 that covers the first partition wall 31. FIG. 12 is a block diagram that schematically illustrates an example of a structure of the second heat insulator 22 according to Variation 3 of Embodiment 2 in the second heat insulation space.

The heat-insulating material 23 is provided in the combustion exhaust gas chamber 110 and covers the first partition wall 31. The combustion exhaust gas chamber 110 and the air heat exchange chamber 130 are thermally insulated from each other by the heat-insulating material 23. Accordingly, the heat-insulating material 23 prevents the combustion exhaust gas that flows through the combustion exhaust gas chamber 110 and has a temperature of approximately 300° C., and the low-temperature electric-power generation air that flows through the air heat exchange chamber 130 and has an inflow temperature of, for example, 25° C. from undergoing heat exchange via the first partition wall 31. As a result, the combustion exhaust gas of the combustion exhaust gas chamber 110 can heat the desulfurization catalyst 11a and the combustion catalyst 12a downstream of the desulfurization catalyst 11a to the respective suitable temperatures without being cooled by the electric-power generation air of the air heat exchange chamber 130.

The heat-insulating material 23 according to Variation 3 of Embodiment 2 may be provided in the fuel cell system 1 according to Variation 1 or 2 of Embodiment 2.

[Variation 4]

Figure 13:
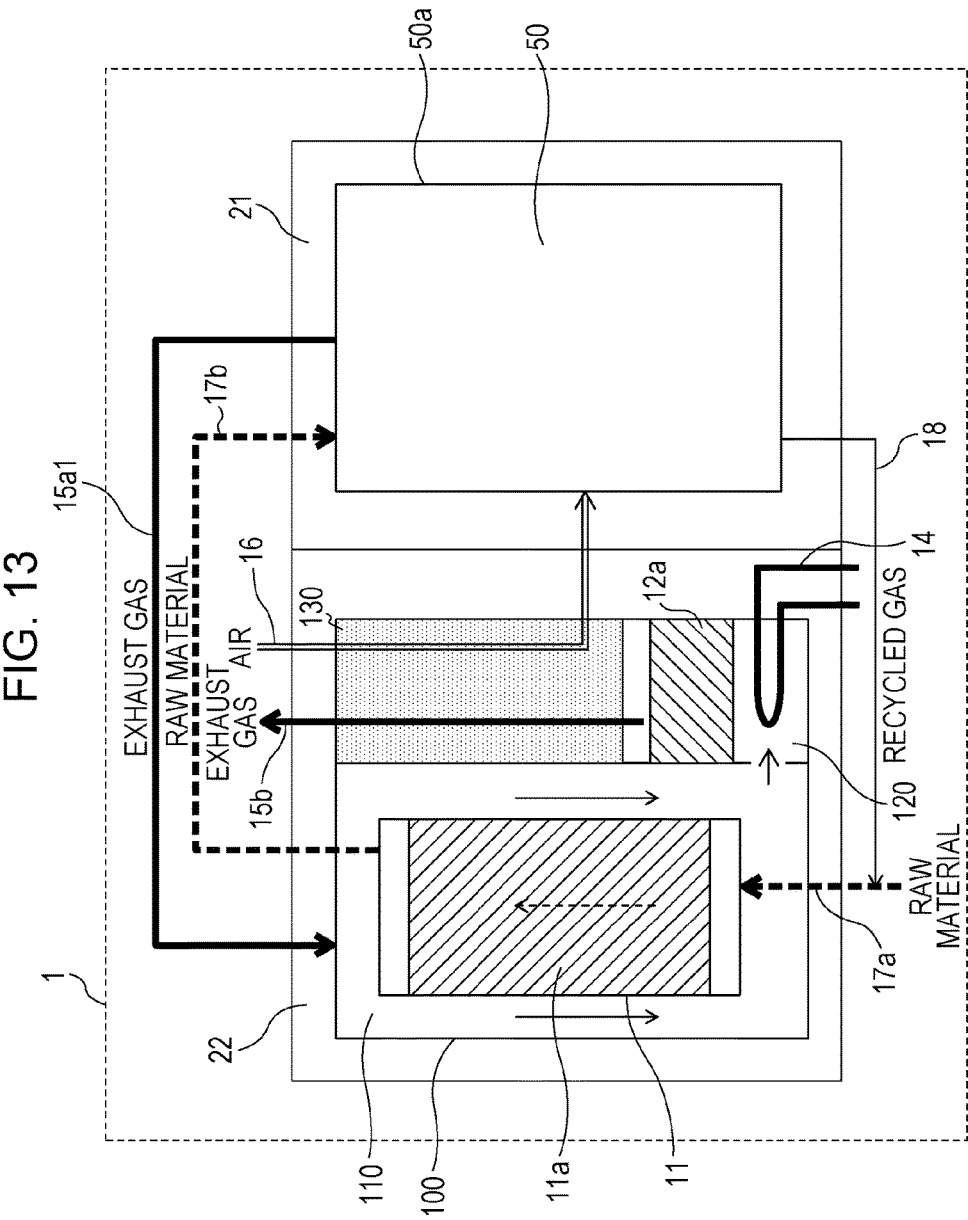
FIG. 13 is a block diagram that schematically illustrates an example of a structure of the fuel cell system according to Variation 4 of Embodiment 2 of the present disclosure.

In the fuel cell system 1 according to Variation 4 of Embodiment 2, as illustrated in FIG. 13, the first heat insulation space and the second heat insulation space are provided so as to be adjacent to each other via the first heat insulator 21 and the second heat insulator 22. Thus, the first heat insulation space and the second heat insulation space are thermally insulated from each other by the heat insulators so as not to allow heat to move from the first heat insulation space to the second heat insulation space due to thermal conduction or radiation. It is however possible for heat to move from the first heat insulation space to the second heat insulation space because of, for example, the combustion exhaust gas that flows through the first combustion exhaust gas passage 15a1. When the first heat insulation space and the second heat insulation space are individually provided so as to be adjacent to each other and are thermally insulated from each other by a heat insulator, the first heat insulator 21 and the second heat insulator 22 may be integrally provided.

All of the above-described embodiments may be combined with each other as long as the embodiments do not preclude each other. It is obvious from the description above to persons skilled in the art that various modifications or other embodiments of the present disclosure may be made. Thus, the description above should be interpreted as mere examples, and is provided for the purpose of teaching the most desirable embodiments for implementing the present disclosure to persons skilled in the art. The details of the structures and/or functions of the present disclosure may be substantially changed without departing from the spirit of the present disclosure.

The fuel cell system of the present disclosure is useful as, for example, a fuel cell system where the efficiency and reliability are increased.

What is claimed is:

1. A fuel cell system comprising:
 a desulfurizer that removes a sulfur compound in a raw material;
 a fuel cell unit that performs electric-power generation using fuel obtained by reforming a raw material from which the sulfur compound is removed and electric-power generation air supplied;
 a combustion exhaust gas passage through which combustion exhaust gas generated by combusting fuel not utilized for the electric-power generation in the fuel cell unit is emitted;
 a combustion exhaust gas container that is connected to the combustion exhaust gas passage and accommodates the desulfurizer inside the combustion exhaust gas container;
 a purifier that removes carbon monoxide included in the combustion exhaust gas; and
 an air heat exchanger that performs heat exchange of the combustion exhaust gas and the electric-power generation air supplied to the fuel cell unit,
 the fuel cell unit being arranged in a first heat insulation space covered with a first heat insulator,
 the combustion exhaust gas container, the purifier, and the air heat exchanger being arranged in a second heat insulation space covered with a second heat insulator.

2. The fuel cell system according to claim 1, further comprising:
 a heater that heats at least one of the combustion exhaust gas container, the desulfurizer, and the purifier.

3. The fuel cell system according to claim 1, wherein the first heat insulation space is arranged so as to be adjacent to the second heat insulation space via the first heat insulator and the second heat insulator.

4. The fuel cell system according to claim 1, wherein the combustion exhaust gas container, the purifier and the air heat exchanger are arranged via at least one partition wall inside a single container covered with the second heat insulator.

5. The fuel cell system according to claim 4, wherein the partition wall between the air heat exchanger and the combustion exhaust gas container is provided with a heat-insulating material.

6. The fuel cell system according to claim 1, wherein the combustion exhaust gas flows through the combustion exhaust gas container, the purifier, and the air heat exchanger in this order.

7. The fuel cell system according to claim 1, further comprising:
 a main air heat exchanger provided in the fuel cell unit, wherein
 the air heat exchanger preheats electric-power generation air transferred to the main air heat exchanger.

8. The fuel cell system according to claim 1, further comprising:
 a lid that covers an opening provided in the purifier so that the opening is openable and closable.

* * * * *